United States Patent [19]

Beckley

[11] Patent Number: 4,491,309

[45] Date of Patent: Jan. 1, 1985

[54] CONVEYOR FOR DIRECTING RIBBONS AWAY FROM A PRINTING PRESS OPERATING AT WALK SPEED

[75] Inventor: Robert A. Beckley, Mount Vernon, Ill.

[73] Assignee: World Color Press, Inc., Effingham, Ill.

[21] Appl. No.: 490,140

[22] Filed: Apr. 29, 1983

[51] Int. Cl.[3] ........................ B41F 13/26; B65G 37/00

[52] U.S. Cl. .................................. 270/20.1; 101/226; 226/109; 226/170; 198/366

[58] Field of Search .................. 270/20.1, 5; 400/611; 101/219, 226–228; 198/348, 351, 362, 365–367, 370, 644, 862; 226/109–111, 170–172, 178, 168

[56] References Cited

U.S. PATENT DOCUMENTS

| | | | |
|---|---|---|---|
| 2,873,654 | 2/1959 | MacCallum | 226/109 |
| 3,252,563 | 5/1966 | Juengel | 198/366 X |
| 3,410,183 | 11/1968 | Sarka | 198/348 X |
| 3,478,654 | 11/1969 | Willard | 226/109 |
| 3,515,328 | 6/1970 | Smith, Jr. | 226/172 |
| 3,602,650 | 8/1971 | Ban | 226/178 |
| 3,679,117 | 7/1972 | Moss | 226/109 |
| 3,810,569 | 5/1974 | Fulk | 226/109 |
| 4,173,611 | 11/1979 | Benson, et al. | 226/110 |
| 4,340,212 | 7/1982 | Simson | 270/20.1 |
| 4,413,764 | 11/1983 | Weber et al. | 226/170 |

FOREIGN PATENT DOCUMENTS

| | | | |
|---|---|---|---|
| 1060792 | 7/1959 | Fed. Rep. of Germany | 198/366 |

*Primary Examiner*—E. H. Eickholt
*Attorney, Agent, or Firm*—Gravely, Lieder & Woodruff

[57] ABSTRACT

The printed ribbons in a high speed printing press are, while the press is operating at walk speed, directed onto a diverting conveyor prior to the forming board of the folder for the press, so that they do not pass through subsequent equipment which does not adequately handle the ribbons at walk speed. The diverting conveyor transports the ribbons away from the press and discharges them into a trash container, or at least allows them to accumulate where they will not interfere with the operation of the press or with pressmen working in the vicinity of the folder. By reason of the diverting conveyor, no pressman is needed to roll up the ribbons when the press operates at walk speed.

19 Claims, 5 Drawing Figures

CONVEYOR FOR DIRECTING RIBBONS AWAY FROM A PRINTING PRESS OPERATING AT WALK SPEED

BACKGROUND OF THE INVENTION

This invention relates in general to printing, and more particularly to an appliance that facilitates handling the unprinted ribbons during the start up procedure for a press.

In high speed printing of the type used for high quality magazines, two webs, which are merely extended lengths of paper, pass through press units where printed impressions are applied, usually by lithographic techniques, to both surfaces of the webs. In color printing, each press unit applies a different color, and to obtain full color four press units are normally required—one for each of the three primary colors and another for black. Thus, a press which prints in full color on two webs will normally have eight press units. Each web is considerably wider than a magazine page and as a consequence several pages are printed side-by-side on a web. Indeed, the normal practice is to print four pages across on each surface of a web.

Immediately beyond the press units, the webs pass into a dryer where solvents are evaporated from the ink, leaving a permanent printed impression on the web. After the dryer each web passes through a slitting apparatus where it is slit midway between its side margins into two ribbons, each having two rows of pages arranged side-by-side in it. These ribbons then pass through a turning device comprising turning bars and multiple rollers, and here the ribbons are directed laterally with respect to the web travel line. The ribbons emerge from the turning device with one overlying the other and further such that the pages on one will subsequently align or register with the pages on the other.

The overlying ribbons thereafter pass through a folder containing a forming board and two rolls at the bottom of each forming board. Here the ribbons from each web are folded in half and over onto each other such that one folded ribbon of the web lies within the other ribbon of the web. Indeed, at the forming board, the ribbons from both of the webs may be brought together so that four folded ribbons emerge one within the other.

Next the folded ribbons pass through a cutter which is part of the folder, and here the ribbons are severed transversely between successive pages. The result is a succession of signatures, which are suitable for later assembly with other signatures into a book or magazine. In any event, the final component of the press is a stacker which arranges the signatures one upon the other, so they may be lifted as bundles from the press and transported to a binding machine for assembly into a magzine or book.

It is not uncommon for high speed printing presses to operate with the webs and ribbons moving at between 1000 and 1400 ft./ min., but before a press can be set in operation at this speed, the webs must be fed through the several printing units and the drier and thereafter threaded through the slitter and turning device. This is done with the press operating at a much slower speed known as the "walk speed". Moreover, during start up, adjustments are sometimes made at the various components to insure that colors are correct, that pages register, and that cuts will be made at the proper locations, and the "walk speed" provides an opportunity to make such adjustments, or at least check them.

The cutter, which is immediately beyond the forming board of the folder does not cut properly at walk speed, and accordingly, it is common practice in the operation of presses to withdraw the ribbons from the press before they reach the forming board. The ribbons at this point are directed laterally. Usually a pressman stands at the side of the press winding the waste ribbons by hand, so that they do not accumulate on the floor to the side of the press where they might interfere with the work of other pressman or become entangled in the stacker. When the press speed is increased, the pressman quickly tears the ribbons and feeds them over the forming board and in between the folding rolls at the bottom of that board. The ribbons then continue to the cutter where they are cut into signatures which emerge in a stack from the stacker.

A pressman's services are mostly needed during the time when a press operates at walk speed, and to use a pressman at this time to merely control and dispose of the waste ribbons is indeed wasteful.

SUMMARY OF THE INVENTION

One of the principal objects of the present invention is to provide an appliance for a printing press which directs waste ribbons away from the immediate vicinity of the press during the operation of the press at walk speed. Another object is to provide an appliance of the type stated which delivers the waste ribbon to a trash container. A further object is to provide an appliance of the type stated which eliminates the need for a pressman to wind up waste ribbon while a press is operating at walk speed and thereby frees the pressman for more productive work. An additional object is to provide an appliance of the type stated which directs the waste ribbon overhead where it does not interfere with pressman working near a press. Still another object is to provide a appliance of the type stated that is simple in construction and inexpensive to fabricate. These and other objects and advantages will become apparent hereinafter.

DESCRIPTION OF THE DRAWINGS

In the accompanying drawings which form part of the specification and wherein like numerals and letters refer to like parts wherever they occur.

DETAILED DESCRIPTION

Figure 1:
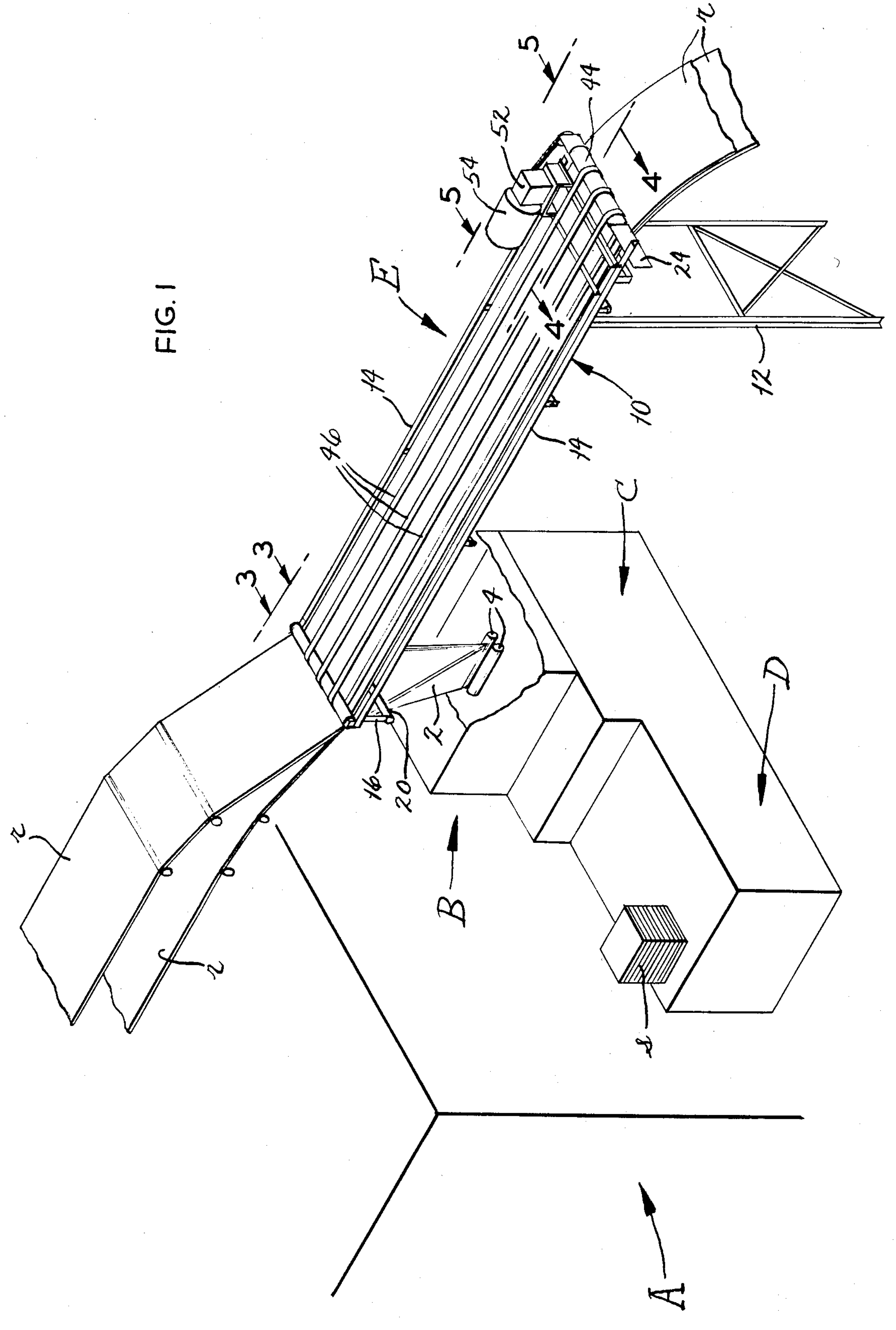
FIG. 1 is a perspective view of a diverting conveyor constructed in accordance with and embodying the present invention, the diverting conveyor being illustrated attached to the folder of a press with ribbons extended from the press into the diverting conveyor.

Referring now to the drawings, a printing press A (FIG. 1) at its end has a folder B through which strips of paper, commonly referred to as ribbons r, pass to be folded intermediate their side margins. The strips or ribbons r, which are derived from slitting a web, move laterally with respect to the web travel line, having been turned after the web is slit. Indeed, the ribbons r approach the folder B in a somewhat elevated condition with one ribbon over the other. If desired, four ribbons r may come together at the folder.

While the folder B constitutes part of the press A, it is located to the side of the web travel line, that is the line along which the webs pass when the inked impressions are applied to them in the press units of the press A. There inked impressions create pages on the web and normally each web has its pages arranged in four side-by-side rows across it on each of its two surfaces. When the webs are slit, each ribbon, of course, has two rows, and after being folded those rows of pages are separated by the fold line. While the pages on the ribbons r differ in content, they are the same size, and they further come into registration at the folder B.

Figure 2:
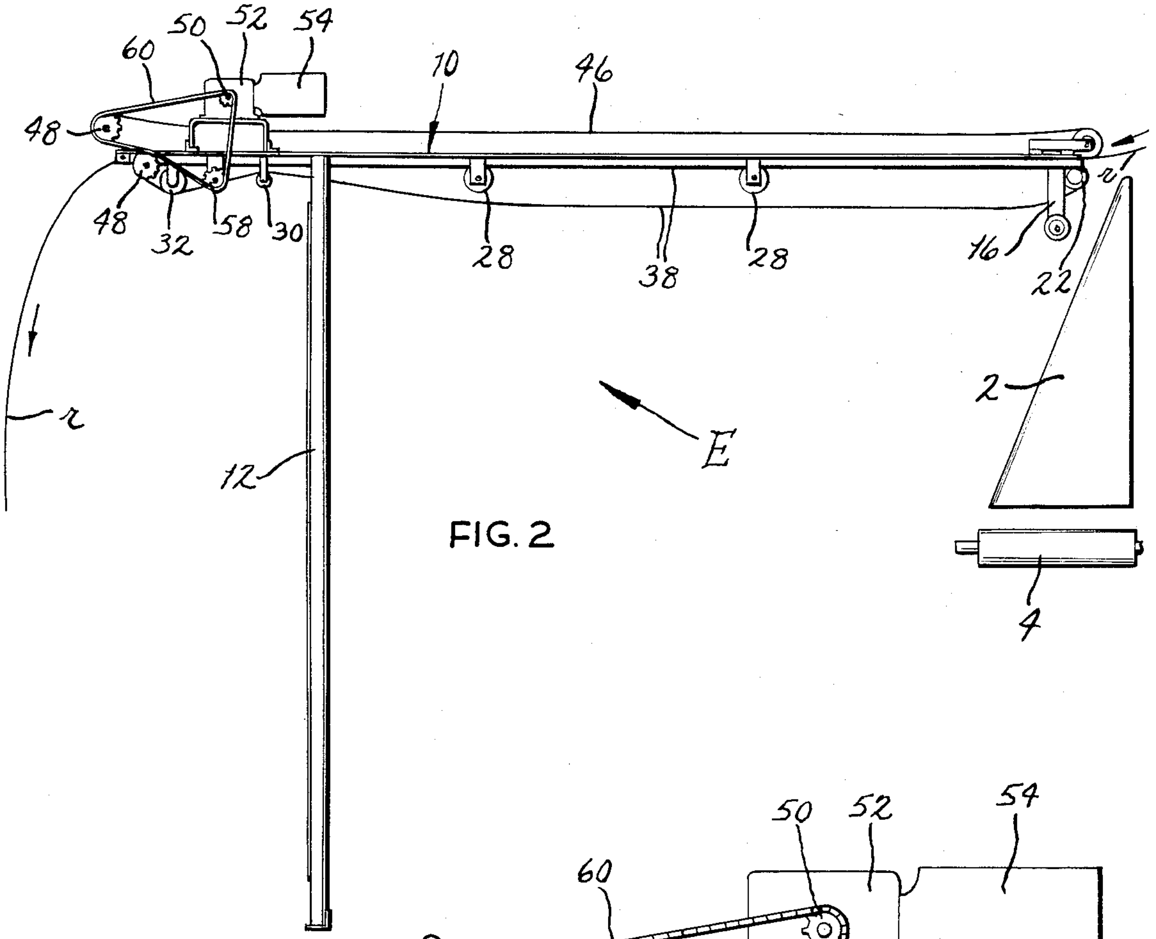
FIG. 2 is a side elevational view of the diverting conveyor and further illustrating the folding board of the press folder.

To effect the folds in the overlying ribbons r, the folder B is provided with a forming board 2 (FIGS. 1 and 2) that is arranged in a generally upright disposition. The upper end of board 2 is straight and wide enough to accommodate the full width of the ribbons r. Indeed, it aligns with the ribbons r so that the ribbons r pass over it. The lower end, on the other hand, possesses parallel surfaces which are perpendicular to the upper end. In the portion between the two ends, the board 2 undergoes a gentle transition from the one orientation to the other, and as a consequence the board 2 possesses a triangular front face and two triangular side faces. The exposed surfaces of the forming board 2 are quite smooth, and the ribbons r as they pass over these surfaces follow the contour of the board 2. Thus, the side margins of the ribbons r are brought generally together and the ribbons r acquire a fold. Immediately below the forming board 2 is a pair of folding rolls 4, and the nip between the rollers 4 aligns with the lower end of the forming board 2. Thus, the ribbons r as they come off of the board 2 in a folded condition are maintained in that condition by the rollers 4. Indeed, the rolls 4 pull the ribbons r across the board 2 and crease the ribbons 4 midway between their margins, producing a distinct fold line in each.

The folder B also contains a cutting device or cutter C which severs the ribbons that are folded together, with the cuts being made in the regions separating successive pages. In other words, the cutter C that is within the folder B severs the folded ribbons r into signatures s. The signatures s advance to a stacker D where they are arranged one on top of the other so that they can be removed from the stacker D as a bundle. These signatures s are ultimately assembled with different signatures s in binding machine to produce a magazine or book.

When the press A is initially placed in operation, the web and ribbons r derived from that web advance quite slowly, perhaps at 20 ft./ min. This is known as the "walk speed", and at this speed pressmen may feed a web through the various press units and the drier that precede the slitter, and beyond the slitter they feed the resulting ribbons r through the turning device that precedes the folder B. However, the cutter C that is within the folder B does not properly sever the folded ribbons r into signatures s when the press A operates at the walk speed, and accordingly, it is customary to withdraw the ribbons r from the folder B before they can pass completely over the forming board 2 and between the folding rolls 4. In this way the folded ribbons r do not reach the cutter C and therefore no cuts are made. Heretofore, a pressman standing beside the folder has typically wound the diverted ribbons r to prevent them from accumulating next to the folder where they might interfere with other pressmen or perhaps become entangled in the stacker.

To prevent the accumulation of ribbons r at the side of the folder B, the press A is provided with a make-ready or diverting conveyor E which transports the overlying ribbons r away from the press A and directs them into a trash container located remote from the folder B. Thus, the ribbons r do not interfere with pressmen working around the folder B. Moreover, the conveyor E is for the most part located above the upper end of the forming board 2, which is somewhat above the height of the pressmen, so it likewise does not interfere with the pressmen. The conveyor E extends laterally from the folder B and aligns with the ribbons r as the ribbons r approach the folder B.

Figure 3:
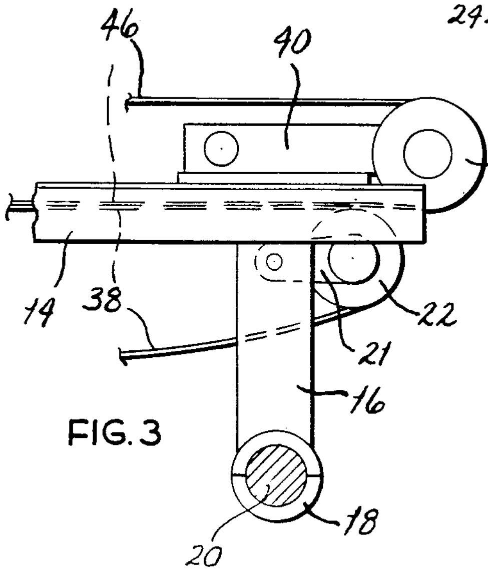
FIG. 3 is an enlarged side elevational view of the tail end of the diverting conveyor taken along line 3—3 of FIG. 1.

The diverting conveyor E includes (FIGS. 1 and 2) a frame 10 which at one end is attached to the folder B. The other end includes an extended leg 12 which is attached to the floor or to some other underlying support. However, the leg 12 is set slightly inwardly from that end, so that the end of the conveyor E may project over a trash container. The frame 10 has two side rails 14 which are spaced apart a distance slightly greater than the width of the ribbons r that approach the folder B. Actually, the frame 10 in the region of the folder B has two short legs 16 (FIG. 3) which extend downwardly from the frame rails 14. At their lower ends, the legs 16 are provided with split collars 18, which clamp around a rod 20 that forms part of the folder B. Indeed, the rod 20 is located slightly outwardly from the upper end of the forming board 2.

Figure 4:
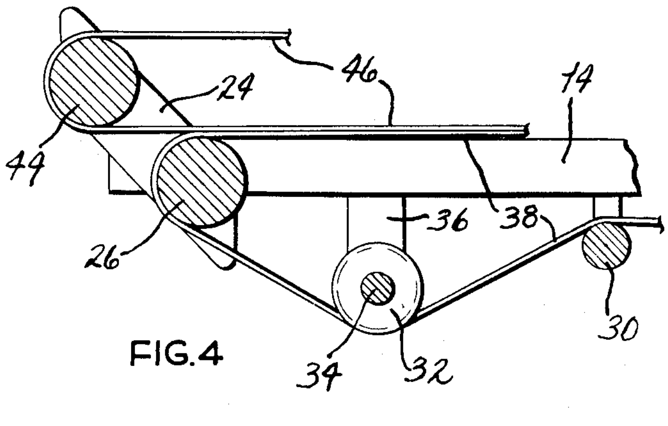
FIG. 4 is an enlarged sectional view of the head end of the diverting conveyor taken along line 4—4 of FIG. 1.

The short legs 16 are fitted with rearwardly directed brackets 21 (FIG. 3) which support a lower tail roller 22 that extends between the two rails 14 and rotates in bearings that are mounted upon the brackets 21. At the opposite end of the frame 10 are brackets 24 (FIGS. 2 and 4) which support a lower head roller 25 that likewise extends between the two rails 14. In addition, the frame 10 carries several idler rollers 28 (FIG. 2) which extend between the two rails 14 and rotate in bearings on the rails 14. All of the idler rollers 28 are located between the extended leg 12 at the head end of the frame 10 and the short legs 16 on the tail end. Beyond the extended legs 12 the frame 10 carries another idler roller 30 that is positioned slightly below the idler rollers 28, and between the idler roller 30 and the head roller 26 are several sheaves 32 (FIGS. 4 and 5) which are mounted on a common shaft 34, the ends of which revolve in bearings attached to brackets 24 that extend downwardly from the side rails 14 of the frame 10, thus presenting the sheaves 32 lower than the rollers 22, 26, 28 and 30.

Extended around the tail roller 22 and head roller 26 as well as over the idler rollers 28 are several belts 38, the upper passes of which move away from the tail roller 22 and toward the head roller 26. After passing off of the head roller 26, lower passes of the belts 38 extend under the sheaves 32 on the common shaft 34, and then over the adjacent idler roller 30, whereupon the lower passes extend unsupported all the way to the tail roller 22. The weight of the belts between the idler roller 30 and the tail roller 22 takes up slack within the belts 38 and maintain the upper passes reasonably taut.

At the folder B the frame 10 is provided with another bracket 40 which supports an upper tail roller 42 that revolves in bearings attached to the bracket 40. The roller 42 is located slightly above and slightly to the rear of the lower tail roller 22. Likewise, at the head end of the frame 10, the brackets 24 support an upper head roller 44 which is located slightly above and slightly ahead of the lower head roller 26. Extended around the tail and head rollers 42 and 44 are more belts 46.

The two tail rollers 22 and 42 constitute the entry to the diverting conveyor E, and this entry is located slightly above and outwardly from the flat upper end of the forming board 2 in the folder B. The upper passes of belts 38 and the lower passes of the belts 46 come together in this region to form a nip into which the ribbons r may extend, in which case they will not pass over the forming board 2 and through the cutter C. Instead, they will be transported along the diverting conveyor E, one over the other, and will be discharged at the far end of that conveyor E.

Figure 5:
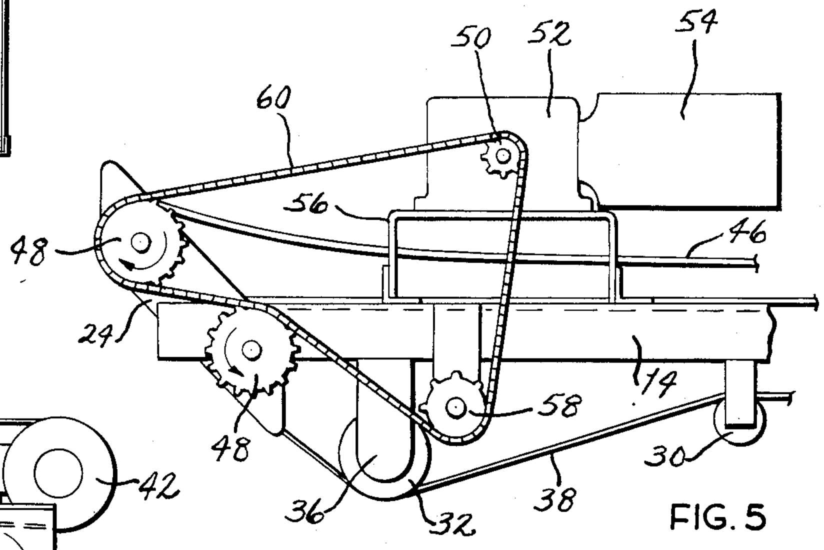
FIG. 5 is an enlarged elevational view of the head end of the diverting conveyor taken along line 5—5 of FIG. 1 and showing the drive mechanism for the conveyor.

In order to move the ribbons r along the conveyor E, the belts 38 and 46 are driven through the respective head rollers 26 and 44 around which they pass. Each belt 38 and 46 moves at the same velocity, with the upper passes of the lower belts 38 and the lower passes of the upper belts 46 moving away from folder B. To this end, the axles for each of the head rollers 26 and 44 pass through the bracket 40 on one side of the conveyor frame 10 where they are fitted with sprockets 48 (FIG. 5). The sprockets 48 align with a drive sprocket 50 which is carried by a shaft extended from the head or gear box 52 of a gearhead motor 54. The motor 54, in turn, is attached to a mount 56 that is bolted to the frame 10 of the diverting conveyor E. The drive sprocket 50 is located almost directly above an idler sprocket 58 which is mounted below the sprockets 48 on a short bracket extended from one of the frame rails 10. All of the sprockets 48, 50 and 58 lie in the same plane, and passed around them is a roller chain 60 which as to the sprockets 48, is directed such that those sprockets and their respective head rollers 26 and 44 revolve in opposite directions.

The motor 54 is connected with the control circuitry for the press A such that the motor 54 operates only when the press A is run at walk speed. Moreover, the velocity at which the motor 54 moves the belts 38 and 46 is slightly greater than that which the press A discharges the ribbons r, which is of course the walk speed of the press, thus, keeping tension on the ribbons. That speed is about 22 ft./ min. In short, the motor 54 is automatically energized when the press slows down to walk speed, and automatically cut off when the press accelerates beyond walk speed.

OPERATION

During the start up procedure for the press A, the web is advanced at the walk speed, and at this operating condition, the gearhead motor 54 of the diverting conveyor E is energized. As a consequence, the upper passes of the lower belts 38 and the lower passes of the upper belts 46 move in unison away from the folder B at a slightly greater speed than the walk speed of the press. The web passes through the slitter where it is separated into two ribbons r and these ribbons, after passing over turning bars and a series of rollers, come together in a direction that is transverse with respect to the web travel line. Indeed, the two ribbons r approach the upper end of the forming board 2 (FIG. 1), and since the feed end or the entry of the diverting conveyor E is located just beyond the upper end of the forming board 2, the ribbons r likewise approach the diverting conveyor E. When each ribbon r reaches the forming board 2, a pressman directs it into the nip between the two belts 38 and 46 of the diverting conveyor E, whereupon it is carried overhead to the discharge end of the diverting conveyor E. While the two ribbons r may not reach the diverting conveyor E at the same time, they eventually come together at the diverting conveyor E and are transported one over the other along that conveyor.

At the end of the diverting conveyor E, the ribbons r are directed into a trash container, or they may merely be allowed to accumulate on the floor. In either case, the ribbons r do not pass through the cutter C of the folder B and consequently are not subject to improper cuts which usually occur at the walk speed. Moreover, the ribbons r do not accumulate next to the folder B where they might interfere with pressmen working in that vicinity or become entangled with the mechanisms of the folder B or stacker D. Furthermore, the services of a pressman are not required to wind or roll up the ribbons r so that they do not accumulate on the floor.

Once the press A is believed to be in condition for operating at higher speeds, the speed is gradually increased and at that time a pressman merely tears the ribbons at the upper ends of the forming board a and directs those ribbons downwardly along the forming board and between the two folding rolls 4 at the bottom of the forming board 2. These ribbons r then pass through the cutter C which by reason of the high operating speed accurately cuts the folded ribbons r into signatures s which are thereafter stacked by the stacker D.

This invention is intended to cover all changes and modifications of the example of the invention herein chosen for purposes of the disclosure which do not constitute departures from the spirit and scope of the invention.

What is claimed is:

1. In combination with a printing press having means for advancing a ribbon of paper, onto which a printed impression has been applied, through a path along which exists means for cutting the ribbon of paper into individual sheets, said means for cutting the ribbon tending to operate more efficiently when the ribbon travels at relatively high operating speeds than when it travels at a much slower start-up speed, the improvement comprising: a diverting conveyor having one end located along the path for receiving the ribbon before it reaches the means for cutting the ribbon of paper and for directing the ribbon to and discharging it at a location remote from the press, whereby the ribbon may be diverted from means for cutting when traveling at the start-up speed.

2. The combination of claim 1 wherein the diverting conveyor carries the ribbon away from the press at a location high enough to enable individuals to walk under the ribbon.

3. The combination according to claim 1 wherein the diverting conveyor is at one end attached to the press, and at its other end has a leg which extends downwardly and rests on a supporting surface.

4. The combination according to claim 1 wherein the diverting conveyor includes a moving surface which supports and moves the ribbon away from the press.

5. The combination according to claim 4 wherein the moving surface is at least one endless belt, and the conveyor further comprises tail and head rollers around which the endless belt extends, the tail roller being located adjacent to the press and the head roller being located remote from the press, and means for driving one of the rollers.

6. The combination according to claim 5 wherein the belt has upper and lower passes and the conveyor further comprises idler rollers for supporting the upper pass of the belt between the tail and head rollers.

7. The combination according to claim 6 wherein the conveyor further comprises a second endless belt located above the first endless belt and having a lower pass which advances at the same speed and in the same direction as the upper pass of the first endless belt.

8. The combination according to claim 4 wherein the means for moving the ribbon away from the press only operates when the press advances the ribbon very slowly at the start-up speed.

9. The combination according to claim 4 wherein the moving surface of the diverting conveyor travels at a velocity slightly greater than the velocity at which the means for advancing the ribbon moves the ribbon at the start-up speed.

10. In combination with a printing press through which a web passes along a web travel line and which includes means along the web travel line for applying printed impressions to the web, means for dividing the web into ribbons after the printed impressions are applied to the web, means for turning the ribbons laterally from the web travel line, and folder means where the ribbons are folded and are thereafter cut into signatures, the improvement comprising a diverting conveyor that extends away from the folder means in a direction transverse to the web travel line and includes a frame and conveying means on the frame for transporting the ribbons away from the folder means before they are folded in the folder means.

11. In combination with a printing press through which a web passes along a web travel line and in which the web, after printed impressions are applied to it, is divided into ribbons which are turned laterally from the web travel line, and including a folder where the ribbons are folded and are thereafter cut into signatures, the improvement comprising a diverting conveyor that extends away from the folder in a direction transverse to the web travel line and includes a frame having two ends, one of which is attached to and supported on the folder, and conveying means on the frame for transporting the ribbons away from the folder before they are folded in the folder.

12. The combination according to claim 11 wherein the frame supports the conveying means and the ribbons transported thereby at an elevation high enough to enable one to walk beneath the conveying means and ribbons.

13. The combination according to claim 12 wherein the frame at its other end includes a leg which extends downwardly and rests on a supporting surface.

14. The combination according to claim 12 wherein the folder includes a forming board which has upstream and downstream ends, the upstream end being flat and oriented such that the ribbons will pass over and parallel to that end, the downstream end having surfaces that lie in a plane perpendicular to the upstream end, and the forming board between its end undergoing a gradual transition from the surface orientation of the upstream end to the surface orientation of the downstream end, and means for drawing the ribbons over the forming board, whereby each ribbon after passing over the forming board acquires a fold between its side margins; and wherein the frame of the diverting conveyor is attached to folder such that the conveying means pick up the ribbons adjacent to the flat upstream end of the forming board.

15. The combination according to claim 13 wherein the conveying means include moving surfaces which contact the ribbons and propel them away from folder, and an electric motor connected with the moving surfaces for imparting movement to them.

16. The combination according to claim 15 wherein the press will advance the web and ribbons at a walk speed which is considerably slower than the speed at which the press advances the web and ribbons when in normal operation, and wherein the electric motor of the diverting conveyor is connected to the press such that it operates only when the press operates at walk speed.

17. The combination according to claim 15 wherein the moving surfaces of the conveying means for the diverting conveyor are located above and below the ribbons when the ribbons are being transported by the diverting conveyor, and wherein the moving surfaces approach each other and form a nip adjacent to the upstream end of the forming board, whereby the ribbons when inserted into the nip will be transported along the diverting conveyor.

18. The combination according to claim 12 wherein the other end of the frame is located remote from the folder, and the conveying surface transports the ribbons to and discharges them from that other end, whereby the ribbons accumulate at a location remote from the folder where they do not interfere with the folder or individuals working in the vicinity of the folder.

19. The combination according to claim 15 wherein the moving surface of the conveying means travels at a velocity slightly greater than the velocity at which the web is discharged onto the diverting conveyor.

* * * * *